United States Patent
Zhu et al.

(10) Patent No.: US 7,735,331 B2
(45) Date of Patent: Jun. 15, 2010

(54) SYSTEM AND METHOD FOR CONTROLLING TEMPERATURE OF AN ENERGY STORAGE DEVICE IN A VEHICLE

(75) Inventors: Douglas X. Zhu, Chandler, AZ (US); Dharmendra Patel, Canton, MI (US); Robert Taenaka, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 793 days.

(21) Appl. No.: 11/533,489

(22) Filed: Sep. 20, 2006

(65) Prior Publication Data

US 2008/0066476 A1    Mar. 20, 2008

(51) Int. Cl.
*F25D 23/12* (2006.01)
*F24F 7/00* (2006.01)
*H05K 7/20* (2006.01)

(52) U.S. Cl. ............... 62/259.2; 236/49.3; 361/695

(58) Field of Classification Search ........... 62/133, 62/296, 259.2; 236/49.3; 361/695
See application file for complete search history.

(56) References Cited

U.S. PATENT DOCUMENTS

| | | | | |
|---|---|---|---|---|
| 1,887,224 A * | 11/1932 | Ward et al. ............ 62/236 |
| 4,425,766 A * | 1/1984 | Claypole ............ 62/133 |
| 5,079,716 A * | 1/1992 | Lenhardt et al. ........ 320/153 |
| 5,082,075 A * | 1/1992 | Karolek et al. ........ 180/68.2 |
| 5,549,153 A | 8/1996 | Baruschke et al. |
| 5,566,879 A * | 10/1996 | Longtin ............ 236/46 R |
| 5,652,500 A * | 7/1997 | Kadouchi et al. ...... 320/150 |
| 5,659,240 A * | 8/1997 | King ............ 320/134 |
| 5,937,664 A | 8/1999 | Matsuno et al. |
| 5,953,207 A * | 9/1999 | Aakalu et al. ........ 361/690 |
| 5,979,540 A * | 11/1999 | Allison et al. ........ 165/41 |
| 6,059,016 A | 5/2000 | Rafalovich et al. |
| 6,076,964 A * | 6/2000 | Wu et al. ............ 374/141 |
| 6,188,574 B1 * | 2/2001 | Anazawa ............ 361/695 |
| 6,377,880 B1 * | 4/2002 | Kato et al. ............ 701/29 |
| 6,464,027 B1 | 10/2002 | Dage et al. |
| 6,476,584 B2 * | 11/2002 | Sakakibara ............ 320/150 |
| 6,481,230 B2 | 11/2002 | Kimishima et al. |
| 6,533,031 B1 * | 3/2003 | Garcia et al. ............ 165/263 |
| 6,624,542 B1 * | 9/2003 | Gabrys et al. ............ 310/54 |
| 6,705,101 B2 | 3/2004 | Brotz et al. |
| 6,805,984 B2 * | 10/2004 | Harth ............ 429/13 |
| 6,945,054 B1 * | 9/2005 | Norman ............ 62/3.2 |
| 7,013,659 B2 * | 3/2006 | Yoshida et al. ........ 62/186 |
| 7,017,361 B2 * | 3/2006 | Kwon ............ 62/239 |
| 7,024,871 B2 | 4/2006 | Zhu et al. |
| 7,331,532 B2 * | 2/2008 | Currie et al. ............ 236/49.3 |
| 2002/0085355 A1 * | 7/2002 | Oda et al. ............ 361/695 |

(Continued)

*Primary Examiner*—Frantz F Jules
*Assistant Examiner*—Alexis K Cox
(74) *Attorney, Agent, or Firm*—David B. Kelley; Brooks Kushman P.C.

(57) ABSTRACT

A system and method for controlling temperature of an energy storage device of a vehicle via a movable device. The method includes determining a set of inputs, the set of inputs including a representative temperature of the energy storage device and a cabin temperature corresponding to an operator cabin. The method further includes generating a control signal based at least in part on the set of inputs, outputting the control signal to the movable device, and modifying a variable rate of movement of the movable device in response to the control signal such that a corresponding variable amount of operator cabin air is moved past the energy storage device.

12 Claims, 6 Drawing Sheets

U.S. PATENT DOCUMENTS

| | | |
|---|---|---|
| 2003/0118891 A1 | 6/2003 | Saito et al. |
| 2004/0163398 A1 | 8/2004 | Morishita et al. |
| 2004/0194489 A1* | 10/2004 | Pode .......................... 62/259.2 |
| 2004/0240177 A1* | 12/2004 | Suzuki et al. ................ 361/695 |
| 2005/0028542 A1 | 2/2005 | Yoshida et al. |
| 2005/0034466 A1* | 2/2005 | Sato et al. ..................... 62/118 |
| 2005/0138941 A1 | 6/2005 | Kikuchi |
| 2006/0080986 A1* | 4/2006 | Inoue ........................ 62/259.2 |
| 2006/0086113 A1* | 4/2006 | Errington et al. .............. 62/181 |
| 2007/0089442 A1* | 4/2007 | Tsuchiya ..................... 62/186 |
| 2007/0214820 A1* | 9/2007 | Olarig et al. ................ 62/259.2 |
| 2009/0249803 A1* | 10/2009 | Suzuki et al. ................... 62/56 |

* cited by examiner

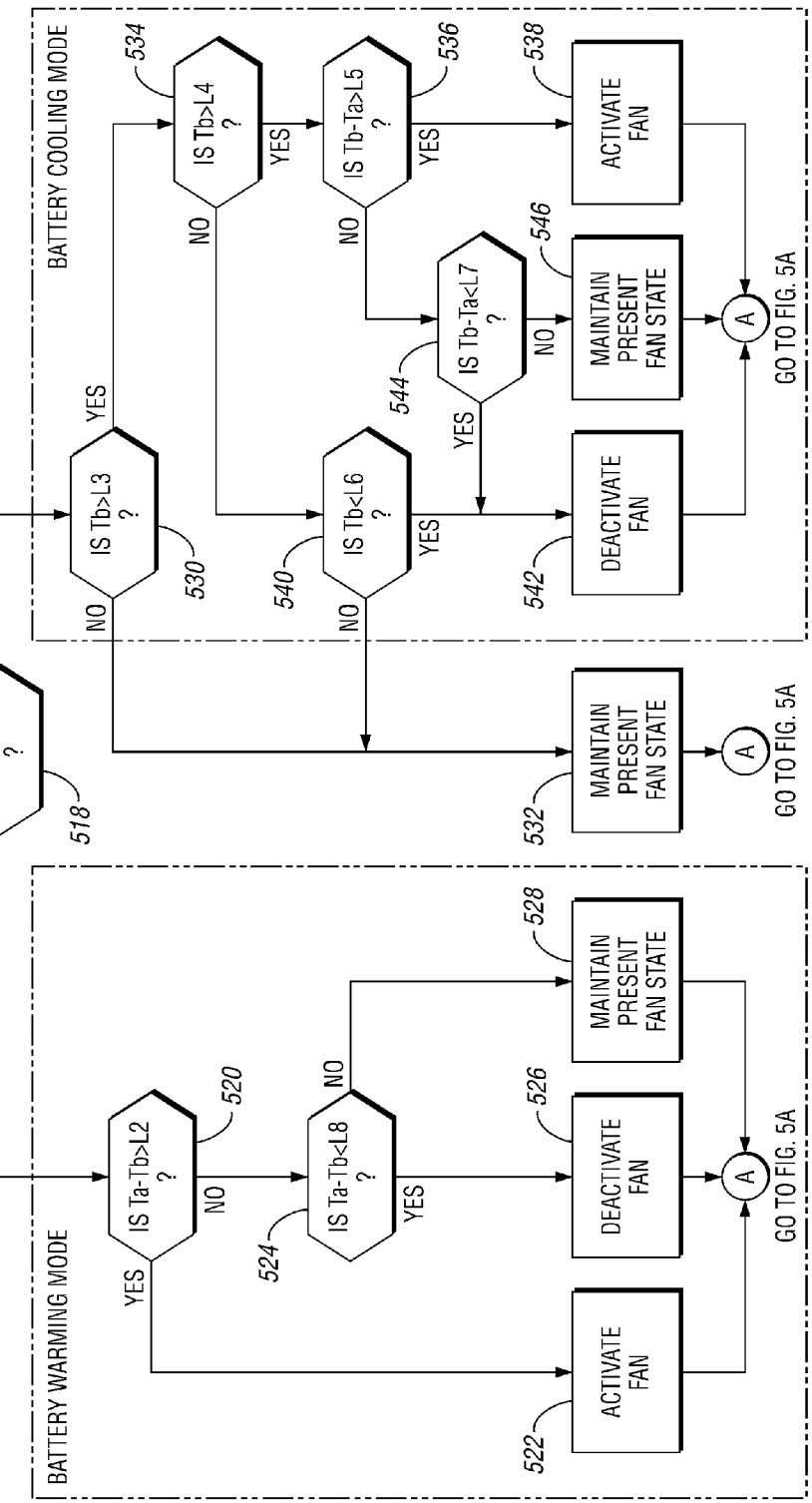

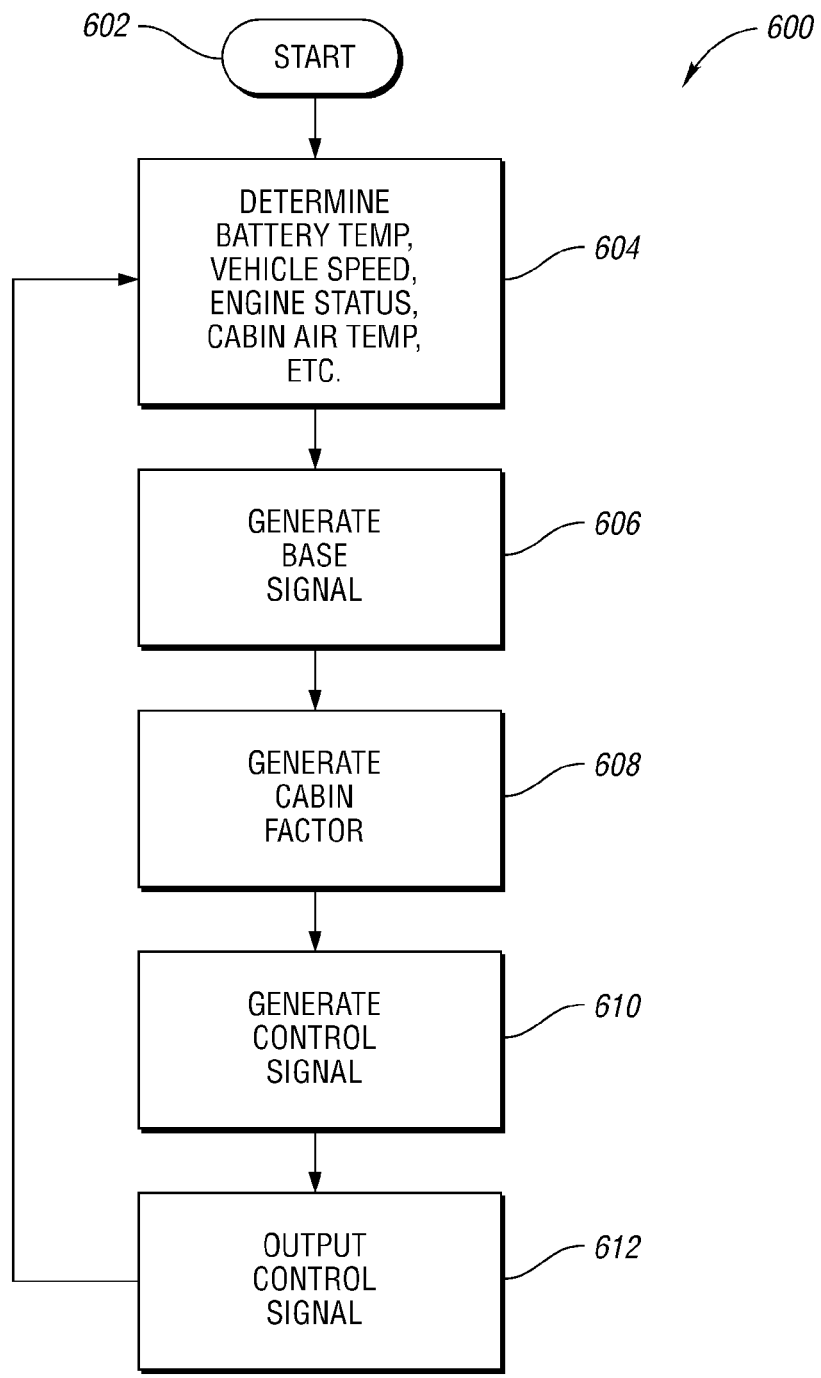

SYSTEM AND METHOD FOR CONTROLLING TEMPERATURE OF AN ENERGY STORAGE DEVICE IN A VEHICLE

BACKGROUND OF THE INVENTION

1. Field of the Invention

The present invention relates generally to a system and method for controlling temperature of an energy storage device in a vehicle, and in particular to a system and method for controlling a movable device to selectively draw air from a vehicle operator cabin toward the energy storage device.

2. Background Art

Governmental regulations and environmental concerns have dictated the need for automobile manufacturers to develop more fuel efficient powertrains. All-electric and hybrid electric powertrains are two examples of such powertrains currently under development. All electric vehicles are generally desirable in that such vehicles offer the potential to be simply regenerated by plugging into a power outlet and may completely eliminate fossil fuel dependence. However, even after many years of research, these vehicles are currently limited by current technology and only have a limited distance range. Hybrid electric vehicles possess increased fuel economy by combining the functionality of electric vehicles with internal combustion vehicles.

Hybrid electric vehicles ("HEVs") combine an internal combustion engine or some other primary source such as a fuel cell system with a secondary power source such as a high powered battery and electric motor. This dual powering mechanism allows HEVs to have extended range and similar refueling to fossil fuel vehicles. Presently, batteries are only able to store enough energy for short trips. Therefore, the inclusion of an internal combustion engine in HEVs allows an onboard generator to recharge the battery and to be used as a power source to run the electric engine. This combination not only leads to increased energy savings but also a decrease in undesirable automobile emissions.

There are currently various designs for hybrid electric vehicles. However, HEVs generally include primary and secondary power sources, a mechanism to propel the vehicle, and one or more energy storage devices. Power sources include internal combustion engines, gas turbines, fuel cells, and the like. Electric motors are one type of mechanism used to propel HEVs and may be combined with a variety of transmission mechanisms, such as, planetary gear sets, CVTs, and other gearing for delivering tractive force to the vehicle's driveline. Although batteries are the most common energy storage devices, alternatives including ultracapacitors are possible.

The high powered batteries which are presently used tend to require cooling, because of the high current drawn to propel a vehicle, and purging of battery gases that build up around the battery. Conventional designs generally implement dedicated air conditioning units to cool/purge the battery. However, air conditioning units add cost, weight and complexity to the vehicle. In addition or in the alternative, conventional designs implement fans to draw cooled air from the vehicle operator cabin toward the battery. However, conventional designs generally implement on/off fan control that is dependent solely on the temperature of the battery. Accordingly, use of the fan may undesirably impact the temperature of the operator cabin by drawing cooled air away from the cabin and operator. Furthermore, it may be desirable to heat the high powered batteries since the discharge output and charge acceptance of a battery are reduced when the battery is cold. Conventional designs generally do not attempt to heat the battery.

Accordingly, there exists a need for improvements in all-electric (i.e., pure electric) and hybrid electric vehicle designs. In particular, there is a need for control strategies and systems that provide battery cooling, heating and/or purging while reducing negative impact on operator cabin comfort.

SUMMARY OF THE INVENTION

According to an embodiment of the present invention, then, a method is provided for controlling temperature of an energy storage device of a vehicle via a movable device disposed proximate the energy storage device. The vehicle includes an operator cabin. The method comprises determining a set of inputs, the set of inputs including a representative temperature of the energy storage device and a cabin temperature corresponding to the operator cabin. The method further includes generating a control signal based at least in part on the set of inputs, outputting the control signal to the movable device, and modifying a variable rate of movement of the movable device in response to the control signal such that a corresponding variable amount of operator cabin air is moved past the energy storage device.

According to another embodiment of the present invention, a method is provided for controlling temperature of an energy storage device of a vehicle via a movable device. The vehicle includes an operator cabin. The method comprises determining a representative temperature of the energy storage device, determining a cabin temperature corresponding to the operator cabin, determining maximum and minimum temperatures corresponding to the energy storage device, calculating a temperature delta corresponding to the difference between the maximum and minimum temperatures, activating the movable device while the temperature delta is greater than a first predetermined delta threshold value, and maintaining a present state of the movable device while the temperature delta is less than a second predetermined delta threshold value, wherein the second predetermined delta threshold value is less than the first predetermined delta threshold value. The method further includes performing the following steps while the temperature delta is less than the first predetermined delta threshold value and greater than the second predetermined delta threshold value: activating the movable device to draw heated air from the operator cabin toward the energy storage device when the representative temperature is less than a first predetermined temperature threshold value and the cabin temperature is greater than the representative temperature by at least a second predetermined temperature threshold value, maintaining the present state of the movable device when the representative temperature is greater than the first predetermined temperature threshold and less than a third predetermined temperature threshold value, and activating the movable device to draw cooled air from the operator cabin toward the energy storage device when the representative temperature is greater than a fourth predetermined temperature threshold value and the representative temperature is greater than the cabin temperature by at least a fifth predetermined temperature threshold value. The third predetermined temperature threshold value is greater than the first predetermined temperature threshold value, and the fourth predetermined temperature threshold value is greater than the third predetermined temperature threshold value.

According to yet another embodiment of the present invention, a system is provided comprising an energy storage device, a vehicle corresponding to the energy storage device and having an operator cabin in fluid communication with the energy storage device, one or more vehicle controllers, a movable device for moving air from the operator cabin past the energy storage device, a re-circulation door actuator for fluidly coupling the operator cabin to an outside atmosphere, and a movable device controller. The movable device controller is in electronic communication with the one or more vehicle controllers, the movable device and the re-circulation door actuator. The movable device controller is configured to receive a set of inputs from the one or more vehicle controllers, the set of inputs including a representative temperature of the energy storage device and a cabin temperature corresponding to the operator cabin. The movable device controller is further configured to generate a first control signal, based at least in part on the set of inputs, for controlling a variable rate of movement of the movable device between a maximum rate of movement and a minimum rate of movement, determine when purging of gases around the energy storage device is desired, activate the movable device when purging of gases around the energy storage device is desired, generate a second control signal when purging of the gases around the energy storage device is desired, output the first control signal to the movable device such that the variable rate of movement of the movable device is modified in response to the first control signal, and output the second control signal to the re-circulation door actuator such that atmospheric air is drawn into the vehicle for, at least partially, purging the gases around the energy storage device.

BRIEF DESCRIPTION OF THE DRAWINGS

FIG. 6 is a flow diagram of a method for controlling temperature of an energy storage device of a vehicle via a movable device according to an embodiment of the present invention.

DETAILED DESCRIPTION

It should be understood that the present invention may be advantageously implemented using any appropriate movable device. Suitable types of movable devices include, for example, a fan, such as an electric and/or electrically actuated fan. Moreover, the present invention may be applied to any type of vehicle having an energy storage device, such as a battery and/or ultracapacitor, requiring cooling, purging, and/or or heating. Suitable types of vehicle include, for example, hybrid electric vehicles (i.e., "HEVs"), fuel cell vehicles, pure-electric vehicles and/or the like. For clarity of illustration, the present invention will be described below with regard to a fan and a battery. However, any appropriate movable device and any appropriate energy storage device may be implemented to meet the design criteria of a particular application.

Figure 1:
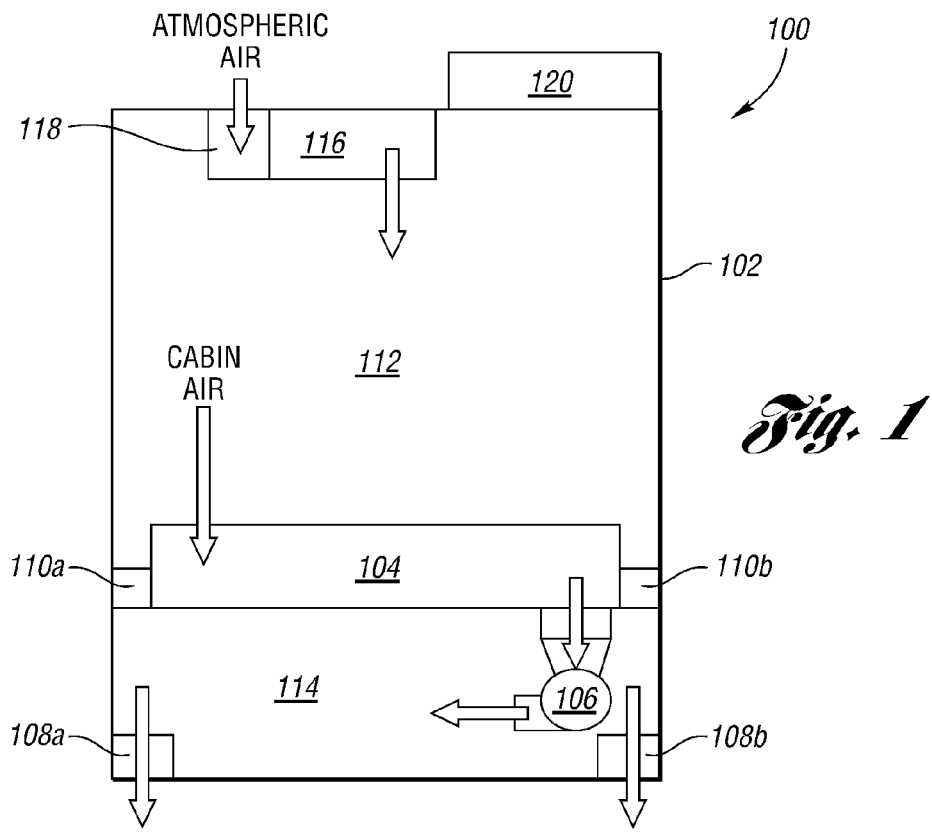
FIG. 1 is a schematic diagram of a vehicle implementing a system for controlling temperature of an energy storage device according to an embodiment of the present invention.

Referring to FIG. 1, a schematic diagram is provided of a vehicle 100 implementing a system 102 for controlling temperature of an energy storage device (e.g., battery) 104 according to an embodiment of the present invention. As illustrated, the vehicle 100 and/or system 102 may comprise one or more batteries 104, one or more movable devices (e.g., fans) 106, one or more air extractors 108 for discharging vehicle air to atmosphere, one or more pathways 110 for fluidly coupling an operator cabin (i.e., cabin) 112 to a battery compartment 114 (e.g., energy storage device housing, vehicle trunk, cargo area, etc.), a cabin air handling system 116 and a re-circulation door 118. In at least one embodiment, the vehicle 100 and/or system 102 may also include an engine 120. FIG. 1 generally illustrates the flow of air to cool, heat and/or purge the battery 104 when the re-circulation door 118 is fully or substantially closed (i.e., flow through mode).

Figure 2:
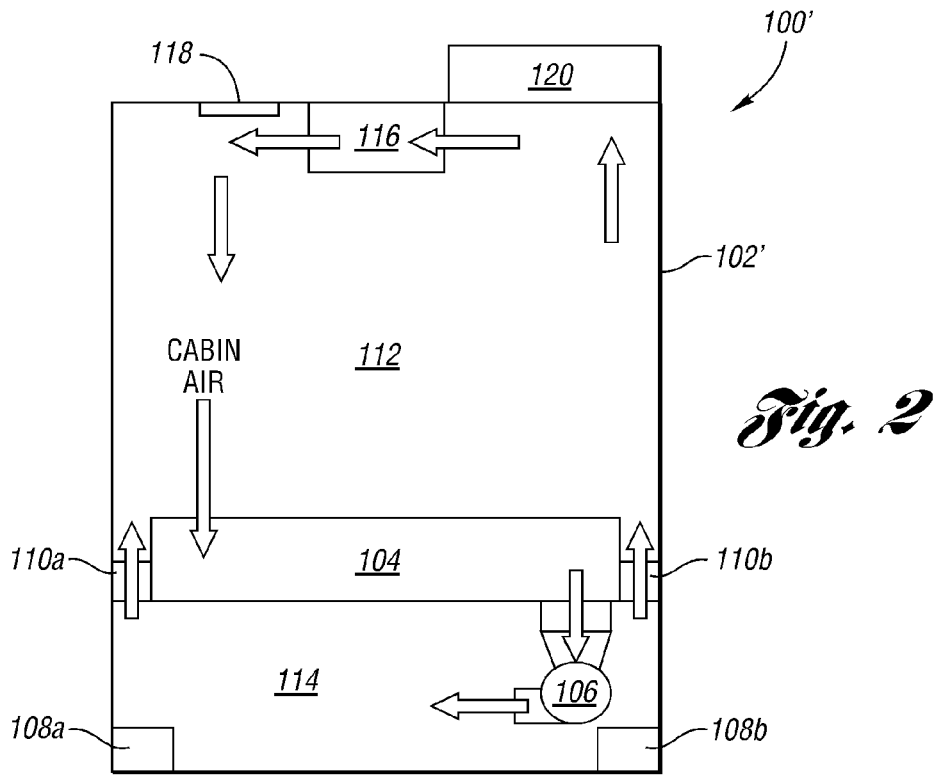
FIG. 2 is a schematic diagram of a vehicle implementing a system for controlling temperature of an energy storage device according to an embodiment of the present invention.

Referring to FIG. 2, a schematic diagram is provided of a vehicle 100' implementing a system 102' for controlling temperature of an energy storage device 104 according to an embodiment of the present invention. In general, the vehicle 100'/system 102' may be implemented similarly to the vehicle 100/system 102, respectively. However, FIG. 2 generally illustrates the flow of air to cool, heat and/or purge the one or more batteries 104 when the re-circulation door 118 is fully or substantially open (i.e., re-circulation mode).

Figure 3:
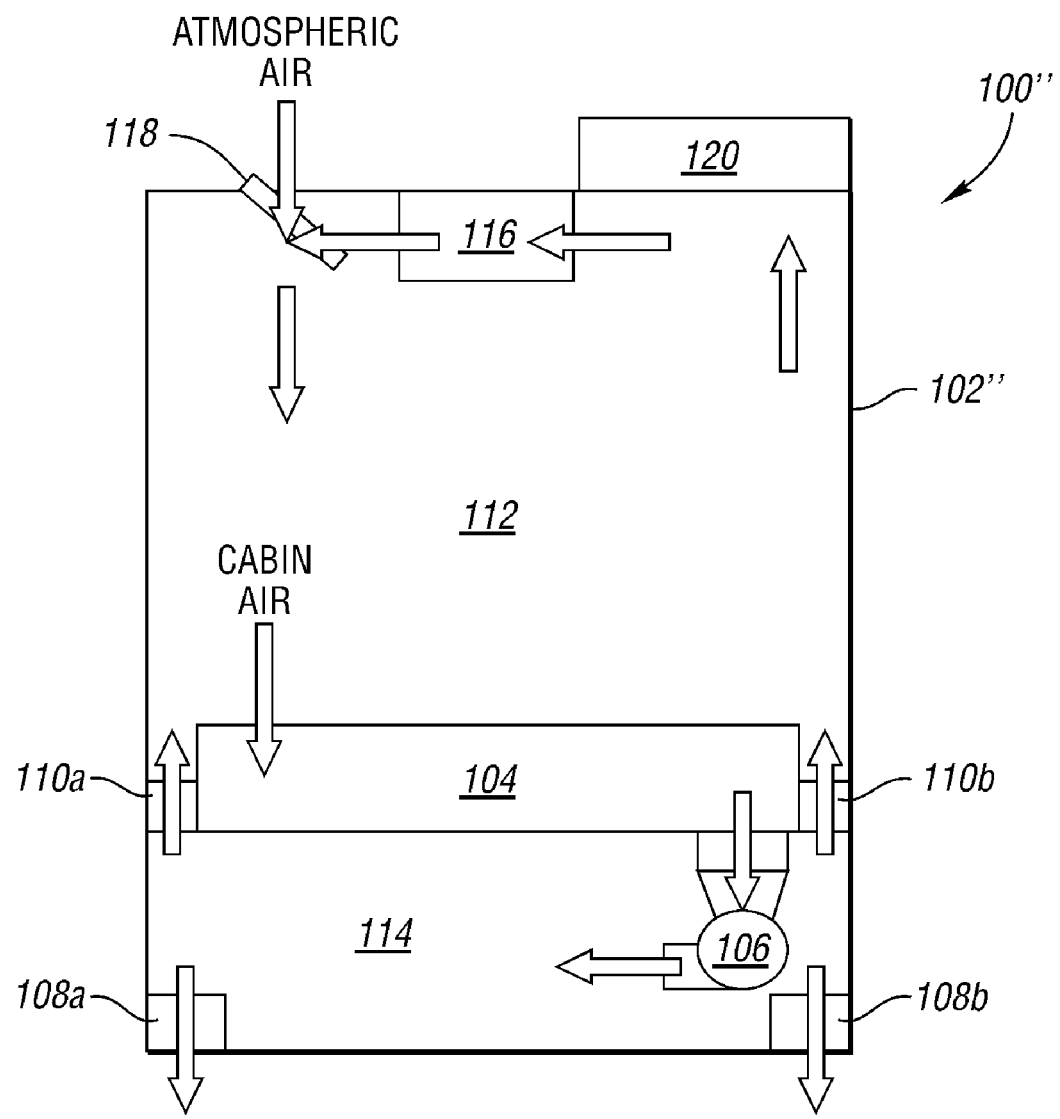
FIG. 3 is a schematic diagram of a vehicle implementing a system for controlling temperature of an energy storage device according to an embodiment of the present invention.

Referring to FIG. 3, a schematic diagram is provided of a vehicle 100" implementing a system 102" for controlling temperature of an energy storage device 104 according to an embodiment of the present invention. In general, the vehicle 100"/system 102" may be implemented similarly to the vehicle 100/system 102, respectively. However, FIG. 3 generally illustrates the flow of air to cool, heat and/or purge the one or more batteries 104 when the re-circulation door 118 is neither fully open nor fully closed (i.e., partial fresh mode).

Figure 4:
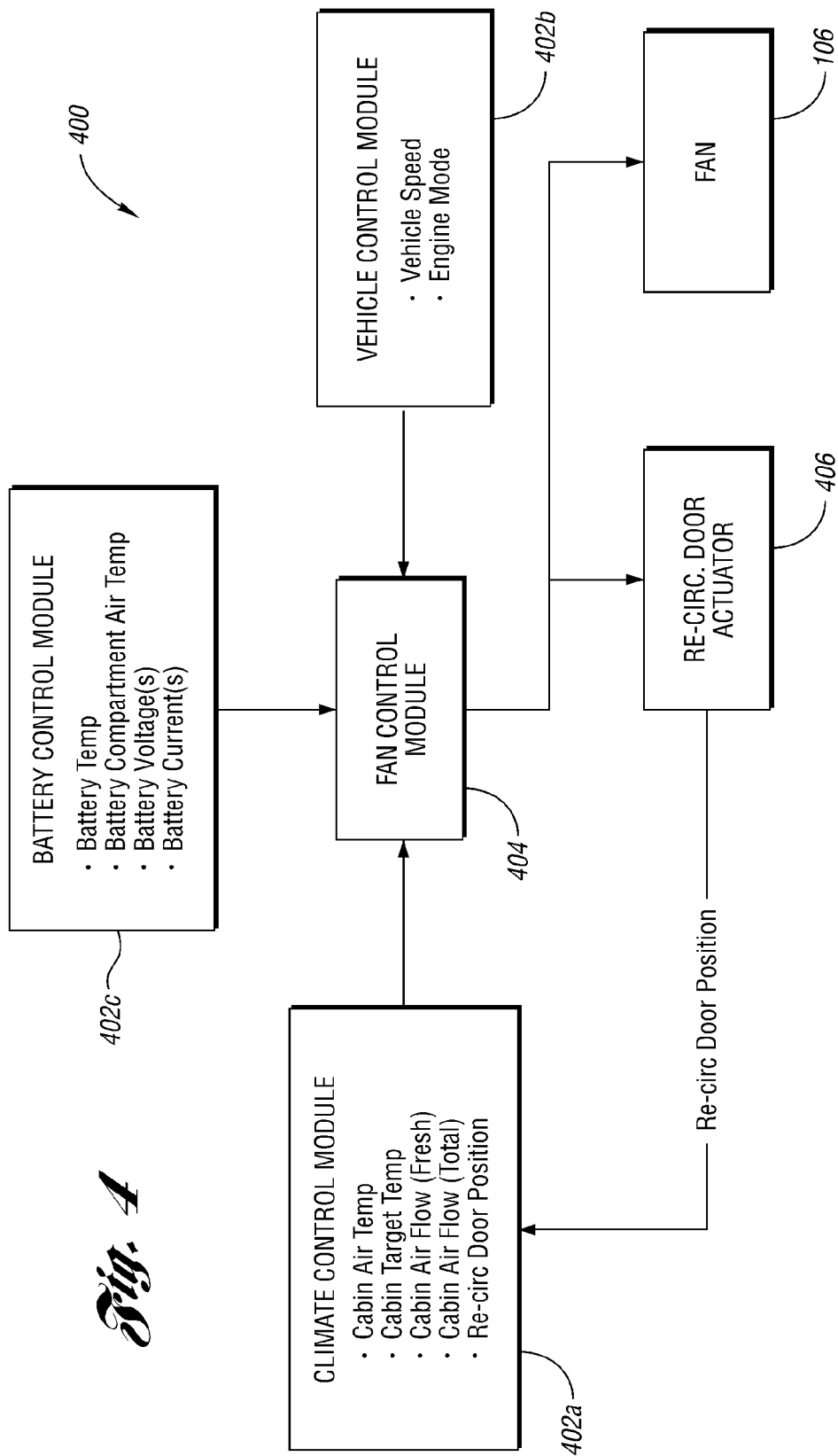
FIG. 4 is a control block diagram of a system for controlling temperature of an energy storage device in a vehicle according to an embodiment of the present invention.

Referring to FIG. 4, a control block diagram is provided of a system 400 for controlling temperature of an energy storage device in a vehicle according to an embodiment of the present invention. The system 400 generally comprises one or more vehicle controllers 402, such as the climate control module 402a, the vehicle control module 402b and/or the battery control module 402c; a fan control module 404; the fan 106 and/or a re-circulation door actuator 406 coupled to the re-circulation door 118 for controlling the position of the door 118 in response to a control signal. In general, the system 400 may be advantageously implemented in connection with the vehicles 100, 100' and 100" discussed previously in connection with the FIGS. 1-3.

In general, the one or more vehicle controllers 402 may be any appropriate device in electronic communication with the fan control module 404 for transmitting a set of inputs to the fan control module 404. In at least one embodiment, the set of inputs comprises one or more signals corresponding to a representative temperature (i.e., Tb) of the energy storage device 104, a cabin temperature (i.e., Ta) corresponding to the operator cabin 112, vehicle speed, operating mode (e.g., on/off) of the engine 120, and/or the like. In at least one other embodiment, the set of inputs may also include one or more signals corresponding to a cabin target temperature (i.e., Ta_sp), flow rate of fresh (i.e., atmospheric) air entering the cabin (i.e., FF_fresh) 112, total flow rate of air circulating in the cabin (i.e., FF_total) 112, temperature of the battery compartment 114, battery voltage, battery current and/or the like.

In general, the fan control module (i.e., fan controller, movable device controller, etc.) 404 may be a computer or other logical device, in electronic communication with (i.e., electronically coupled to) the vehicle controllers 402, the fan 106 and/or the re-circulation door actuator 406, which executes programs and/or which performs other logical exercises. The fan control module 404 generally receives (i.e., determines) the set of inputs and generates a first control signal, based at least in part on the set of inputs, for controlling a variable rate of movement (i.e., variable speed) of the fan 106 between a maximum rate of movement and a minimum rate of movement. The controller 404 may also be configured to determine when purging of gases around the battery 104 is desired. When purging is desired, the controller 404 generally activates the fan 106 and generate a second control signal corresponding to the position of the re-circulation door 118. Accordingly, the controller 404 may output the first control signal to the fan 106 such that the variable rate of movement of the fan 106 is modified in response to the first control signal. Similarly, the controller 104 may output the second control signal to the re-circulation door actuator 406 such that atmospheric air may be drawn into the vehicle (e.g., 100) for, at least partially, purging the gases around the battery 104. In at least one embodiment, the re-circulation door 118 and/or the re-circulation door actuator 406 may provide a position feedback signal to one or more of the vehicle controllers 402, such as the climate control module 402a.

As previously described, the fan 106 represents any appropriate movable device for moving air from the operator cabin 112 past the battery 104. In at least one embodiment, the fan 106 may be implemented proximate the battery 104. However, the fan 106 may be implemented in any suitable position and/or configuration to meet the design criteria of a particular application.

Similarly, the re-circulation door actuator 406 may be any appropriate mechanism coupled to and/or integrated with the re-circulation door 118 for manipulating a position of the re-circulation door 118 such that the operator cabin 112 may be selectively fluidly coupled to an atmosphere outside of the vehicle.

In at least one embodiment, one or more of the methods subsequently described in connection with FIGS. 5A, 5B and 6 may also be implemented in connection with the fan control module 404 and/or the system 400 to provide additional functionality.

Figure 5A:
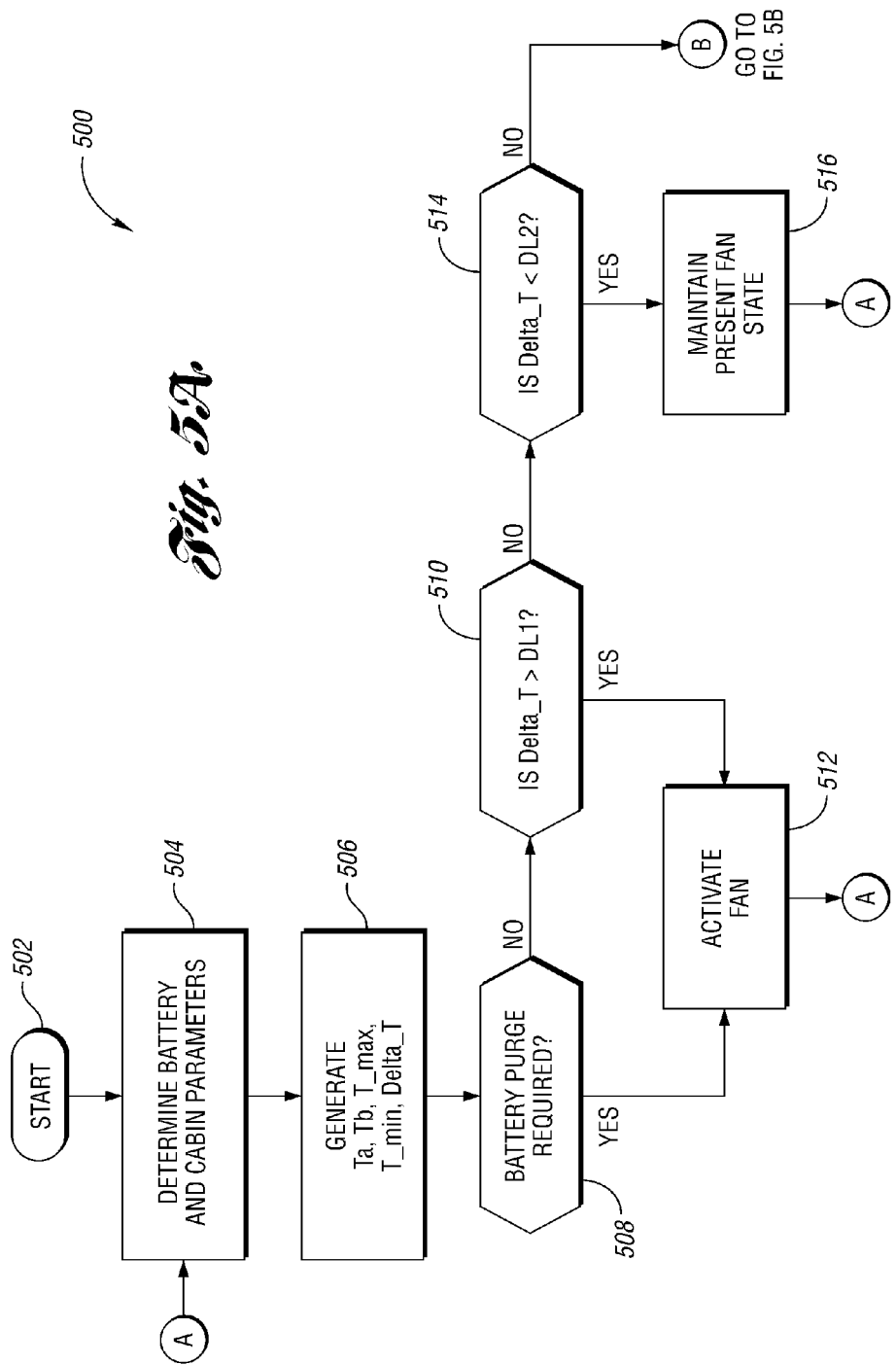
FIGS. 5(A-B), is a flow diagram of a method for controlling temperature of an energy storage device of a vehicle via a movable device according to an embodiment of the present invention.

Referring to FIGS. 5A and 5B, a flow diagram is provided of a method 500, according to an embodiment of the present invention, for controlling temperature of an energy storage device (e.g., battery 104) of a vehicle (e.g., 100) via a movable device (e.g., fan 106), the vehicle having an operator cabin (e.g., 112). In particular, the method 500 may generally provide on/off mode control of the fan while reducing negative impact on operator cabin comfort. The method 500 may be advantageously implemented in connection with the systems 102, 102', 102" and/or 400 described previously in connection with FIGS. 1-4, and/or any appropriate system to meet the design criteria of a particular application. In particular the method 500 is generally performed by a logical device, such as the controller 404. The method 500 generally includes a plurality of blocks or steps that may be performed serially. As will be appreciated by one of ordinary skill in the art, the order of the blocks/steps shown in FIGS. 5A and 5B is exemplary and the order of one or more block/step may be modified within the spirit and scope of the present invention. Additionally, the blocks/steps of the method 500 may be performed in at least one non-serial (or non-sequential) order, and one or more blocks/steps may be omitted to meet the design criteria of a particular application. Similarly, two or more of the blocks/steps of the method 500 may be performed in parallel. Step 502 generally represents an entry point into the method 500.

At step 504, one or more battery and/or operator cabin (i.e., cabin) parameters may be determined. In at least one embodiment, the parameters may be determined by receipt, at a controller performing method 500, of one or more signals from one or more vehicle controllers (e.g., 402). However, the parameters may be determined using any appropriate mechanism, such as direct measurement/observance by the controller performing method 500, to meet the design criteria of a particular application. From step 504 the method 500 may fall through to step 506.

At step 506, one or more parameters may be identified, determined, generated and/or the like from, at least in part, the parameters determined in step 504. In at least one embodiment, step 506 may include determination of a representative temperature of the battery (i.e., Tb) and a cabin temperature (i.e., Ta). In addition, maximum and minimum temperatures corresponding to the energy storage device may also be determined. More particularly, a plurality of temperature sensors may be used to determine a plurality of battery temperatures. The maximum/minimum temperature generally corresponds to the highest/lowest temperature recorded among the plurality of temperature sensors, respectively. In such an embodiment, an algorithm and/or other appropriate mechanism may be used to generate the representative temperature of the battery from the plurality of battery temperatures. From the maximum and minimum temperatures, a temperature delta may be calculated by taking the difference between the maximum and minimum temperatures. From step 506 the method 500 may fall through to decision block 508.

Decision block 508 generally determines when it is desirable and/or required to purge gases from around the battery. Such purging may be desirable/required, for example, when the battery has a high state of charge. When purging is desired (i.e., the YES leg of decision block 508), the method 500 generally falls through to step 512 to purge the battery. In addition, a re-circulation door (e.g., 118) may be at least partially closed such that outside air (i.e., atmospheric air) is drawn into the vehicle and propelled, via the fan, toward the battery for, at least partially, purging the gases around the battery. Otherwise (i.e., the NO leg of decision block 508), the method 500 generally falls through to decision block 510.

At decision block 510, the temperature delta is compared with a first predetermined delta threshold value. When the temperature delta is greater than the first predetermined delta threshold value (i.e., the YES leg of decision block 510), the method 500 generally falls through to step 512. Such a condition (i.e., the YES leg of decision block 510) generally corresponds to a large temperature imbalance in the battery requiring immediate action, regardless of such action's effect on the cabin temperature. Otherwise (i.e., the NO leg of decision block 510), the method 500 generally falls through to decision block 514.

At step 512, the fan is activated (i.e., turned ON) to draw air from the operator cabin toward the battery. From step 512, the method 500 may return, in an iterative manner, to any appropriate preceding step, such as step 504.

At decision block 514, the temperature delta is compared with a second predetermined delta threshold value. When the temperature delta is less than the second predetermined delta threshold value (i.e., the YES leg of decision block 514), the method 500 generally falls through to step 516. Such a condition (i.e., the YES leg of decision block 514) generally corresponds to a small temperature imbalance in the battery requiring no heated/cooled air diversion from the operator cabin. While the temperature delta is less than the first predetermined delta threshold value and greater than the second predetermined delta threshold value (i.e., the NO leg of decision block 514), the method 500 generally falls through to decision block 518. Such a condition (i.e., the NO leg of decision block 514) generally corresponds to a temperature imbalance in the battery requiring controlled (e.g., variably controlled) heated/cooled air diversion from the operator cabin. It may be noted that the second predetermined delta threshold value is generally less than the first predetermined delta threshold value.

At step 516, the present state (on/off) of the fan, as generally determined by operator control, is generally maintained (i.e., unaltered by method 500). From step 516, the method 500 may return, in an iterative manner, to any appropriate preceding step, such as step 504.

At decision block 518, the representative temperature (i.e., Tb) is compared with a first predetermined temperature threshold value. When the representative temperature is less than the first predetermined temperature threshold value (i.e., the YES leg of decision block 518), the method 500 generally falls through to decision block 520. Otherwise (i.e., the NO leg of decision block 518), the method 500 generally falls through to decision block 530.

At decision block 520, the difference between the cabin temperature (i.e., Ta) and the representative temperature (i.e., Tb) is compared with a second predetermined temperature threshold value. When the cabin temperature is greater than the representative temperature by at least the second predetermined temperature threshold value (i.e., the YES leg of decision block 520), the method 500 generally falls through to step 522. Otherwise (i.e., the NO leg of decision block 520), the method 500 generally falls through to decision block 524.

At step 522, the fan (i.e., the movable device) may be activated. In general, activation of the fan draws heated air from the operator cabin toward the battery (i.e., energy storage device). From step 522, the method 500 may return, in an iterative manner, to any appropriate preceding step, such as step 504.

At decision block 524, the difference between the cabin temperature (i.e., Ta) and the representative temperature (i.e., Tb) is compared with an eighth predetermined temperature threshold value. When the cabin temperature is greater than the representative temperature by less than the eighth predetermined temperature threshold value (i.e., the YES leg of decision block 524), the method 500 generally falls through to step 526. Otherwise (i.e., the NO leg of decision block 524), the method 500 generally falls through to decision block 528.

At step 526, the fan may be de-activated. Step 526 generally corresponds to a condition requiring no diversion of heated air from the operator cabin. From step 526, the method 500 may return, in an iterative manner, to any appropriate preceding step, such as step 504.

At step 528, the present state (on/off) of the fan, as generally determined by operator control, is generally maintained (i.e., unaltered by method 500). From step 528, the method 500 may return, in an iterative manner, to any appropriate preceding step, such as step 504.

In general, decision blocks/steps 520, 522, 524, 526 and 528 represent a battery warming algorithm which at least partially controls, via control of the fan, the diversion of heated air from the operator cabin to the battery.

At decision block 530, the representative temperature (i.e., Tb) is compared with a third predetermined temperature threshold value. When the representative temperature is greater than the third predetermined temperature threshold value (i.e., the YES leg of decision block 530), the method 500 generally falls through to decision block 534. Otherwise (i.e., the NO leg of decision block 530), the method 500 generally falls through to step 532. In general, the third predetermined temperature threshold value is greater than the first predetermined temperature threshold value.

At step 532, the present state (on/off) of the fan, as generally determined by operator control, is generally maintained (i.e., unaltered by method 500). From step 532, the method 500 may return, in an iterative manner, to any appropriate preceding step, such as step 504.

At decision block 534, the representative temperature (i.e., Tb) is compared with a fourth predetermined temperature threshold value. When the representative temperature is greater than the fourth predetermined temperature threshold value (i.e., the YES leg of decision block 534), the method 500 generally falls through to decision block 536. Otherwise (i.e., the NO leg of decision block 534), the method 500 generally falls through to decision block 540. In general, the fourth predetermined temperature threshold value is greater than the third predetermined temperature threshold value.

At decision block 536, the difference between the representative temperature (i.e., Tb) and the cabin temperature (i.e., Ta) is compared with a fifth predetermined temperature threshold value. When the representative temperature is greater than the cabin temperature by at least the fifth predetermined temperature threshold value (i.e., the YES leg of decision block 536), the method 500 generally falls through to step 538. Otherwise (i.e., the NO leg of decision block 536), the method 500 generally falls through to decision block 544.

At step 538, the fan (i.e., the movable device) may be activated. In general, activation of the fan draws cooled air from the operator cabin toward the battery (i.e., energy storage device). From step 538, the method 500 may return, in an iterative manner, to any appropriate preceding step, such as step 504.

At decision block 540, the representative temperature (i.e., Tb) is compared with a sixth predetermined temperature threshold value. When the representative temperature is less than the sixth predetermined temperature threshold value (i.e., the YES leg of decision block 540), the method 500 generally falls through to step 542. Otherwise (i.e., the NO leg of decision block 540), the method 500 generally falls through to step 532. In general, the sixth predetermined temperature threshold value is less than or equal to the fourth predetermined temperature threshold value.

At step 542, the fan may be de-activated. Step 542 generally corresponds to a condition requiring no diversion of cooled air from the operator cabin. From step 542, the method 500 may return, in an iterative manner, to any appropriate preceding step, such as step 504.

At decision block 544, the difference between the representative temperature (i.e., Tb) and the cabin temperature (i.e., Ta) is compared with a seventh predetermined temperature threshold value. When the representative temperature is greater than the cabin temperature by less than the seventh predetermined temperature threshold value (i.e., the YES leg of decision block 544), the method 500 generally falls through to step 542. Otherwise (i.e., the NO leg of decision block 544), the method 500 generally falls through to step 546.

At step 546, the present state (on/off) of the fan, as generally determined by operator control, is generally maintained (i.e., unaltered by method 500). From step 546, the method 500 may return, in an iterative manner, to any appropriate preceding step, such as step 504.

In general, decision blocks/steps 530, 534, 536, 538, 540, 542, 544 and 546 represent a battery cooling algorithm which at least partially controls, via control of the fan, the diversion of cooled air from the operator cabin to the battery.

Referring to FIG. 6, a flow diagram is provided of a method 600, according to an embodiment of the present invention, for controlling temperature of an energy storage device (e.g., battery 104) of a vehicle (e.g., 100) via a movable device (e.g., fan 106), the vehicle having an operator cabin (e.g., 112). In particular, the method 600 may generate a control signal for variably controlling a variable rate of movement of the fan (i.e., variable speed control). The method 600 may be advantageously implemented in connection with the systems/methods 102, 102', 102'', 400 and/or 500 described previously in connection with FIGS. 1-5, and/or any appropriate system/method to meet the design criteria of a particular application. In particular the method 600 is generally performed by a logical device, such as the controller 404. The method 600 generally includes a plurality of blocks or steps that may be performed serially. As will be appreciated by one of ordinary skill in the art, the order of the blocks/steps shown in FIG. 6 is exemplary and the order of one or more block/step may be modified within the spirit and scope of the present invention. Additionally, the blocks/steps of the method 600 may be performed in at least one non-serial (or non-sequential) order, and one or more blocks/steps may be omitted to meet the design criteria of a particular application. Similarly, two or more of the blocks/steps of the method 600 may be performed in parallel. Step 602 generally represents an entry point into the method 600.

At step 604, a set of inputs may be determined (i.e., identified, calculated, etc.). In at least one embodiment, the set of inputs include a representative temperature (i.e., Tb) of the energy storage device (e.g., 104) and/or a cabin temperature (i.e, Ta) corresponding to the operator cabin (e.g., 112). In at least one other embodiment, the set of inputs may further include a speed (i.e., Vspeed) of the vehicle (e.g., 100) and an operating mode (e.g., ON/OFF) of an engine (e.g., 120) corresponding to the vehicle. However, the set of inputs may include any appropriate input to meet the design criteria of a particular application. From step 604, the method 600 generally falls through to step 606.

At step 606, a base signal may be generated. In at least one embodiment, the base signal (i.e., BS) may correspond to $Ceng+[C1 \times Vspeed]+[C2 \times (Tb-Tr)]+[C3 \times (Tb-Tr)^2]$. That is:

$$BS = Ceng + [C1 \times Vspeed] + [C2 \times (Tb-Tr)] + [C3 \times (Tb-Tr)^2]$$

In general, Ceng, C1, C2 and C3 are predetermined constants corresponding to the operating mode of the engine, Vspeed is the speed of the vehicle, Tb is the representative temperature and Tr is a reference temperature. In at least one embodiment, Ceng corresponds to a minimum variable rate of movement (i.e., minimum speed) of the fan. Similarly, C1 may be derived such that noise associated with movement of the fan is generally masked by road noise. Last, C2 and C3 may be derived to boost the variable rate of movement of the fan when Tb is greater than Tr. In one exemplary embodiment, Ceng, C1, C2, C3 and Tr may, respectively, correspond to 50%, 0.9%/kph, 1.2%/° C., 0.35%/° C.$^2$, and 30° C. when the engine is operating (i.e., engine mode is ON). In such an exemplary embodiment, the minimum BS value may correspond to 50% and the maximum BS value may correspond to 100%. Similarly, in the exemplary embodiment, Ceng, C1, C2, C3 and Tr may, respectively, correspond to 30%, 0.6%/kph, 2.5%/° C., 0.0%/° C.$^2$, and 30.0 when the engine is not operating (i.e., engine mode is OFF). In such an exemplary embodiment, the minimum BS value may correspond to 40% and the maximum BS value may correspond to 80%. However, any appropriate values may be implemented for Ceng, C1, C2, C3 and Tr to meet the design criteria of a particular application. From step 606, the method 600 generally falls through to step 608.

At step 608, a cabin factor may be generated. In at least one embodiment, the cabin factor (i.e., CF) may correspond to the following algorithm:

$$CF = 1 - \frac{DTcab - DTcab\_min}{DTcab\_max - DTcab\_min}$$

where:

$$DTcab = |Ta - Ta\_sp|$$

In general, Ta corresponds to a cabin temperature, Ta_sp corresponds to a target (i.e., desired) cabin temperature (i.e., a cabin temperature setpoint), and DTcab_max and DTcab_min are predetermined constants. In at least one embodiment, DTcab_max may equal a first temperature span corresponding to a minimum cabin factor, and DTcab_min may equal a second temperature span corresponding to a maximum cabin factor. However, DTcab_max and DTcab_min may correspond to any appropriate predetermined constant to meet the design requirements of a particular application.

It may be noted that, in at least one embodiment, a CF_lowerlimit and a CF_upperlimit may be determined based on the following algorithms:

$$CF\_lowerlimit = FF\_fresh/BATflow\_max$$

$$CF\_upperlimit = CABoffset/BATflow\_max$$

Where:

$$CABoffset = C10 + (C11 \times Vspeed) + (C12 \times FF\_total)$$

C10, C11 and C12 are predetermined constants calibrated to obtain maximum allowable extra air flow above the cabin air flow.

FF_fresh/FF_total correspond to the flow rate of fresh (i.e., atmospheric)/total (i.e., fresh and re-circulated) air passing through a front blower, such as the cabin air handling system 116, respectively.

Vspeed corresponds to the speed of the vehicle.

BATflow_max corresponds to the maximum possible (e.g., faceplate value) air flow through the movable device (e.g., fan) 106.

In at least one embodiment, C10, C11 and C12 may equal 50, 1 and 1, respectively. However, C10, C11 and C12 may be any appropriate values to meet the design criteria of a particular application.

Alternatively, embodiments of the present invention may be implemented having upper and lower CF limits not determined from the preceding CF_upperlimit and CF_lowerlimit equations. From step 608, the method 600 generally falls through to step 610.

At step 610, a control signal based at least in part on the set of inputs may be generated. In at least one embodiment, the control signal (i.e., CS) may correspond to the product of the base signal and the cabin factor. That is, CS=BS×CF. In addition, in at least one embodiment, the resulting control signal may be further modified based on noise, vibration and/or harshness factors (i.e., NVH parameters).

In at least one embodiment, the base signal and/or the control signal may be a pulse width modulated (i.e., PWM) signal. However, any appropriate control signal of any appropriate form may be implemented to meet the design criteria of a particular application. From step 610, the method 600 generally falls through to step 612.

At step 612, the control signal may be outputted to a movable device (e.g., the fan 106) such that a variable rate of movement (i.e., variable speed) of the movable device is modified in response to the control signal. Accordingly, a corresponding variable amount of operator cabin air may be moved past the energy storage device (e.g., battery 104) via the movable device in response to the control signal. From step 612, the method 600 may return, in an iterative manner, to any appropriate preceding step, such as step 604. Alternatively, the method 600 may be exited upon completion of step 612.

In accordance with various embodiments of the present invention, the methods described herein may be implemented as programs running on a processor, such as a computer processor. Dedicated hardware implementations including, but not limited to, application specific integrated circuits, programmable logic arrays and other hardware devices can likewise be constructed to implement the methods described herein.

It should also be noted that the program implementations of the present invention as described herein are optionally stored on a tangible storage medium, such as a magnetic medium, a magneto-optical or optical medium, or a solid state medium. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the program implementations herein are stored.

Accordingly, the systems and methods described above may provide battery cooling, heating and/or purging, via diversion of conditioned operator cabin air toward the energy storage device, while reducing negative impact on operator cabin comfort.

While the best mode for carrying out the invention has been described in detail, those familiar with the art to which this invention relates will recognize various alternative designs and embodiments for practicing the invention as defined by the following claims.

What is claimed:

1. A method for controlling temperature of a battery of a vehicle via a movable device, the vehicle having an operator cabin, the method comprising:
    determining a representative temperature of the battery;
    determining a cabin temperature corresponding to the operator cabin;
    determining maximum and minimum temperatures corresponding to the battery;
    determining a speed of the vehicle and an operating mode of an engine corresponding to the vehicle;
    calculating a temperature delta corresponding to the difference between the maximum and minimum temperatures;
    activating the movable device while the temperature delta is greater than a first predetermined delta threshold value;
    maintaining a present state of the movable device while the temperature delta is less than a second predetermined delta threshold value, wherein the second predetermined delta threshold value is less than the first predetermined delta threshold value; and
    performing the following steps while the temperature delta is less than the first predetermined delta threshold value and greater than the second predetermined delta threshold value:
        activating the movable device to draw heated air from the operator cabin toward the battery when the representative temperature is less than a first predetermined temperature threshold value and the cabin temperature is greater than the representative temperature by at least a second predetermined temperature threshold value;
        maintaining the present state of the movable device when the representative temperature is greater than the first predetermined temperature threshold and less than a third predetermined temperature threshold value, wherein the third predetermined temperature threshold value is greater than the first predetermined temperature threshold value; and
        activating the movable device to draw cooled air from the operator cabin toward the battery when the representative temperature is greater than a fourth predetermined temperature threshold value and the representative temperature is greater than the cabin temperature by at least a fifth predetermined temperature threshold value, wherein the fourth predetermined temperature threshold value is greater than the third predetermined temperature threshold value, including:
    generating a control signal based at least in part on a base signal, which is function of the vehicle speed and the representative temperature, and the cabin factor, which is a function of the cabin temperature and a target cabin temperature;
    controlling a variable rate of movement of the movable device, when the movable device is activated;
    outputting the control signal to the movable device; and
    modifying the variable rate of movement of the movable device in response to the control signal.

2. The method of claim 1 further comprising determining when purging gases around the battery is desired and activating the movable device to draw air from the operator cabin toward the battery.

3. The method of claim 2 further comprising at least partially closing a re-circulation door associated with the vehicle such that outside air is drawn into the vehicle and propelled, via the movable device, toward the battery for, at least partially, purging the gases around the battery.

4. The method of claim 1 further comprising maintaining the present state of the movable device when the representative temperature is greater than the third predetermined temperature threshold value, the representative temperature is less than the fourth predetermined temperature threshold value, the representative temperature is greater than a sixth predetermined temperature threshold value, the temperature delta is less than the first predetermined delta threshold value and the temperature delta is greater than the second predetermined delta threshold value, wherein the sixth predetermined temperature threshold value is less than or equal to the fourth predetermined temperature threshold value.

5. The method of claim 1 further comprising maintaining the present state of the movable device when the representative temperature is greater than the third and fourth predetermined temperature threshold values, the representative temperature is greater than the cabin temperature by less than the fifth predetermined temperature threshold value, the representative temperature is greater than the cabin temperature by at least a seventh predetermined temperature threshold value, the temperature delta is less than the first predetermined delta threshold value and the temperature delta is greater than the second predetermined delta threshold value.

6. The method of claim 1 further comprising maintaining the present state of the movable device when the representative temperature is less than the first predetermined temperature threshold value, the cabin temperature is greater than the representative temperature by less than the second predetermined temperature threshold value, the cabin temperature is greater than the representative temperature by at least an eighth predetermined temperature threshold value, the temperature delta is less than the first predetermined delta threshold value and the temperature delta is greater than the second predetermined delta threshold value.

7. The method of claim 1 further comprising by:
generating a base signal, the base signal (BS) corresponding to $$C_{eng}+C_1 V_{speed}+C_2(T_b-T_r)+C_3(T_b-T_r)^2$$

wherein Ceng, C1, C2 and C3 are predetermined constants corresponding to the operating mode of the engine, Vspeed is the speed of the vehicle, Tb is the representative temperature and Tr is a reference temperature;

generating a cabin factor (CF), the cabin factor corresponding to 1−[(DTcab−DTcab_min)/(DTcab_max−DTcab_min)], wherein DTcab is the absolute difference between the cabin temperature and the target cabin temperature, Dtcab_max and DTcab_min are predetermined constants; and generating the control signal based at least in part on the base signal and the response to the control signal.

8. The method of claim 7 wherein Ceng corresponds to a minimum variable rate of movement of the movable device; C1 is derived such that noise associated with movement of the movable device is masked by road noise, and C2 and C3 are derived to boost the variable rate of movement of the movable device when Tb is greater than Tr.

9. The method of claim 7 wherein DTcab_max equals a first temperature span corresponding to a minimum cabin factor and DTcab_min equals a second temperature span corresponding to a maximum cabin factor.

10. The method of claim 7 wherein the control signal is a pulse width modulated control signal and the movable device is a fan.

11. A vehicle, comprising:
a battery;
an operator cabin in fluid communication with the battery;
a fan for moving air from the operator cabin past the battery;
a selectable re-circulation door fluidly coupling the operator cabin to an outside atmosphere; and
a controller electronically coupled to the fan and the battery wherein the controller activates the fan and commands the re-circulation door to open in response to a determination that purging of the battery is desired, and the controller is electronically coupled to temperatures sensors which are coupled to the battery, the operator cabin, and the vehicle, the controller:
determining a representative battery temperature based on the output of the temperature sensors; determining a cabin temperature; and determining a vehicle speed, and
commanding the fan according to a base signal (BS) and a cabin factor (CF) wherein the controller generates $$BS=C_{eng}+C_1 V_{speed}+C_2(T_b-T_r)+C_3(T_b-T_r)^2$$

with $C_{eng}$, $C_1$, $C_2$, and $C_3$ being predetermined constants and $T_r$ being a reference temperature and $$CF = 1 - \frac{DT_{cab} - DT_{cab\_min}}{DT_{cab\_max} - DT_{cab\_min}}$$

with $DT_{cab}$ being a difference between the cabin temperature and the target cabin temperature and $DT_{cab}$ and $DT_{max}$ being predetermined constants.

12. The vehicle of claim 11 wherein the controller is electronically coupled to temperature sensors coupled to the battery, the controller determines a minimum temperature and a maximum temperature based on the signals from the temperature sensors, a temperature delta based on a difference between the minimum temperature and the maximum temperature, and activates the fan when the temperature delta is greater than a first predetermined delta threshold.

* * * * *